76-81.2
J. LAMONT, Dec'd.
J. and A. P. LAMONT, assignees.
RAZOR STROP.
No. 10,029. Reissued Feb. 7, 1882.
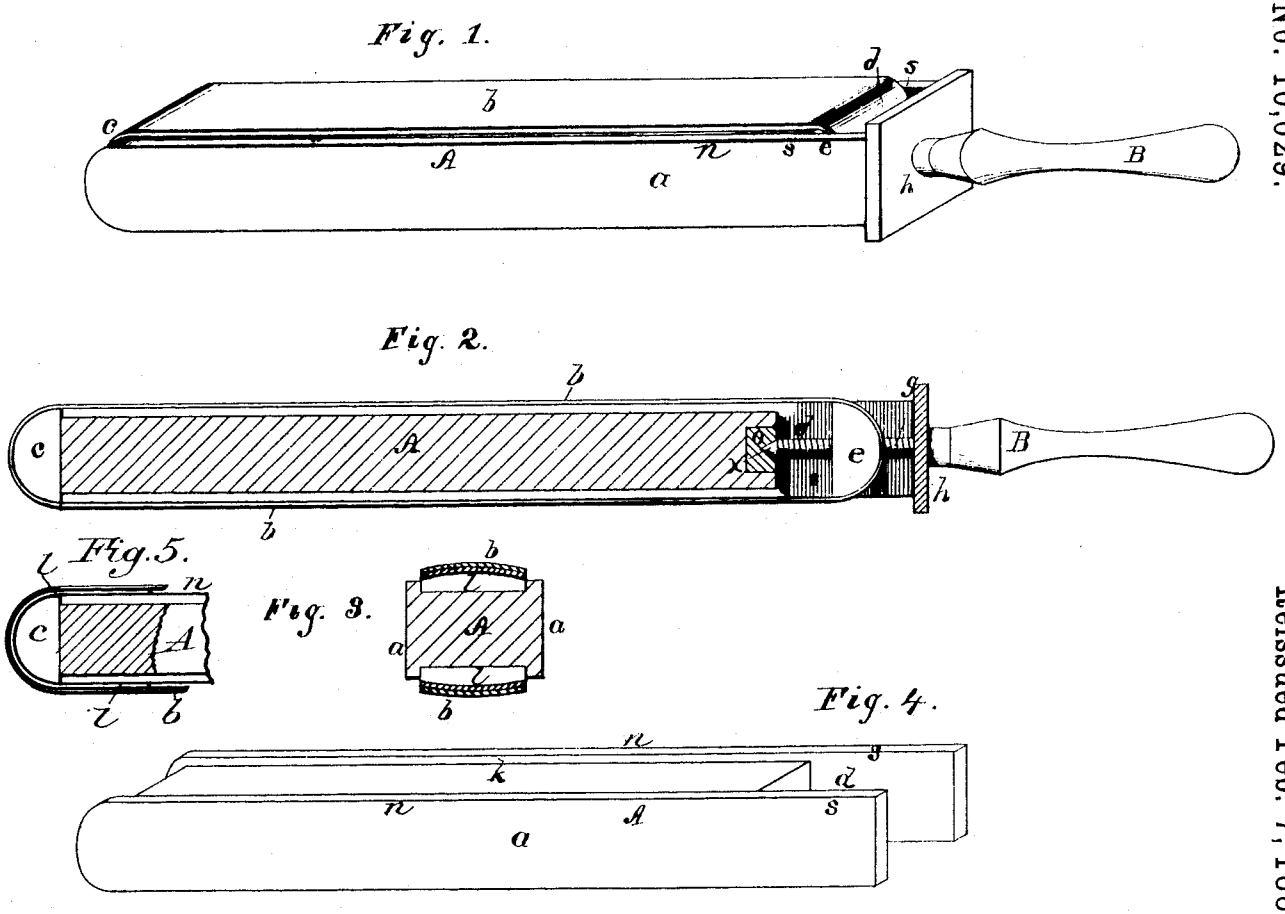
Attest:
Geo. Hebard.
W. S. Otis.
Inventor:
John Lamont & Alex. P. Lamont
assignees of James Lamont, dec'd.
By E. B. Whitmore, Atty.
N. PETERS, Photo-Lithographer, Washington, D. C.

BEST AVAILABLE COPY

UNITED STATES PATENT OFFICE.

JOHN LAMONT AND ALEXANDER P. LAMONT, OF ROCHESTER, NEW YORK, ASSIGNEES OF JAMES LAMONT, DECEASED.

RAZOR-STROP.

SPECIFICATION forming part of Reissued Letters Patent No. 10,029, dated February 7, 1882.

Original No. 173,477, dated February 15, 1876. Reissue No. 8,181, dated April 16, 1878. Application for reissue filed October 7, 1881.

*To all whom it may concern:*

Be it known that JAMES LAMONT, of the city of Rochester, in the county of Monroe and State of New York, deceased, did invent a new and useful Improvement in Razor-Strops, which improvement was secured to him by Letters Patent numbered 173,477, dated February 15, 1876, and assigned to us, JOHN LAMONT and ALEXANDER P. LAMONT, both of said city, county, and State, said patent having been reissued to us April 16, 1878, and numbered 8,181, which improvement is fully set forth in the following specification and accompanying drawings.

This improvement relates to that class of razor-strops in which a strap or belt is suspended longitudinally over a frame or body and adjusted as to tension by means of a screw and nut.

On account of use and frequent stropping the edges of razor-blades become rounded, and occasionally have to be brought to a true taper or wedge shape in cross-section by rubbing them upon hones or coarsely-graded surfaces, a fine edge being reproduced after honing or shaping the edge by the use of several graded surfaces, from coarse to fine. One coarse surface or hone and one fine or finishing surface are not enough to bring a dull rounded edge into good condition. Intermediate-graded surfaces between the coarsest and finest are necessary. Further, the hone or more coarsely graded surfaces should be placed upon rigid unyielding backings or bodies, and the finishing or more finely graded surfaces upon straps or bodies that bend under the pressure of the blade. With a strap that bends under the blade and presents a concave surface to the same the blade is much more quickly brought to a fine edge, for then only a narrow line of metal adjacent to the edge is subjected to abrasion during the process of sharpening. If this bending or concave surface be coarsely graded, it will work quick destruction to the edge of the blade. In view of these facts, the strops found in the above-mentioned and other classes are known to be objectionable and faulty in various respects and generally incomplete. For instance, the strops shown in patents to J. B. Lucas, Nos. 139,011 and 145,742, and to C. L. Fowle, No. 5,938, have no hones, and the sharpening-surfaces are formed upon yielding bodies, and are therefore useful only to finish the edge of a blade after it has been brought to a moderate degree of fineness upon some other instrument. Cushion-strops similar to that shown in patent to Evans, No. 102,790, have the objection that when the strap becomes slack from use there are no means provided by which its tension can be adjusted. Moreover, cushioned straps are more expensive and found to be not so good as the simple suspended strap. The strop shown in patent to Earle, No. 38,101, has the serious fault of having in its construction the order of the grades in part reversed—that is to say, a hone or coarser surface is formed upon a yielding body, while the finer surfaces, upon which it is designed to give the finishing strokes of the blade, are formed upon the sides of a rigid body. Boardman's strop (shown in Patent No. 2,925) has a convex hone, useful in concaving razor-blades; but otherwise it is the old four-sided block, with sharpening surfaces formed upon the rigid sides. W. M. Green, in his fiddle-bow strop, patented August 1, 1871, materially advances the state of the art by producing an instrument with which, unassisted by another, a dull razor having a rounded edge may be brought into a good condition for shaving. This invention, however, has the section of having the hone placed down between raised blocks or parts of the body on account of which the delicate edge of the razor is endangered from the liability being brought against said raised parts while being applied to the hone. Green's strop is further objectionable, in that the is covered by the sustained straps, which renders it useless until said straps are thrown off, and operation that is time and is inconvenient. In this state the art persons using razors must submit to the inconvenience of use of Green's strop or else be attending the expense and trouble of providing two strops or instruments with which to sharpen razors.

BEST AVAILABLE COPY

The object of the invention hereinafter described is to produce a razor-strop in which the disadvantages and objections of other strops heretofore used are avoided, and to furnish a more convenient and complete instrument for sharpening razors upon, which is accomplished by employing new parts and devices and combining with them certain old parts, the whole forming an improved strop possessing great advantages over those in common use.

Figure 1 of the accompanying drawings shows this improved razor-strop in perspective; Fig. 2, a side elevation with the hone-body longitudinally and vertically sectioned through the center; Fig. 3, a transverse vertical section of the hone-body and straps; Fig. 4, a perspective view of the hone-body with the detachable parts removed, and Fig. 5 a view of a portion of the farther end of the strop.

Referring to the figures, A represents the hone body or frame of the strop, and B the handle. The hone-body has a rectangular recess, *d*, cut in at the near or handle end thereof through from side to side, leaving free end tongues, *s s*, rigid with the hone-body.

*b* is a strop or belt of leather or textile fabric, passed longitudinally around the hone-body from end to end thereof, bending over a fixed bridge, *c*, extending across the farther end of the hone-body from side to side of the same, and at the near end through the recess *d* and over a movable block, *e*, therein corresponding to the bridge *c*. The recess *d* is an important feature in the form of the hone-body. It is not a mortise or isolated orifice, but an opening or recess formed in the end of the hone-body through from side to side thereof, by means of which the belt or strap *b* is enabled to encircle the hone-body longitudinally, and the walls or tongues *s s* prevent the lateral displacement of said belt by the action of the razor-blade when drawn diagonally across it. This recess, opening out at the end of the hone-body, as it does, on account of the substance of work [illegible] being removed thereat, facilitates the [illegible] forming the cavity in which the block *o* rests [illegible] the placing of said block therein. A strip of [illegible] the recess [illegible] lock of wood, *h*, is made to span the tongues [illegible] being secured to the ends of The handle B [illegible] which a screw-th[illegible] provided with a rod, *g*, upon passing through [illegible] is cut, said rod or screw axis of the body A, [illegible] in the block *h* in the *x* resting within or ag[illegible] having its pointed end hone-body, as shown. [illegible] the inner end of the the end *x* of the screw re[illegible] the point at which body a block, *o*, is inserted against the hone-said end of the screw *g*. The[illegible] ceive and hold through the block *e*, which is [illegible] also passes nally with a screw-thread and [illegible] ded inter-said screw. By rotating the hand[illegible] a nut for *e* may be moved one way or the o[illegible] the nut within the recess *d*, tightening or loose[illegible] along strap *b*, as desired, the tendency of t[illegible] the *e* to rotate with the handle being overcom[illegible] nut the rigid tongues *s s*, which also form guides for the nut as it moves between them, with direct bearings between said guides and nut. The block *h* acts as a bearing between the handle and the block or nut *e*, to steady and hold the handle and stay the weaker parts *s s* of the hone-body. It is also purposely made larger and broader than a cross-section of the strop, for the purpose of appearance and to form a stopper for the mouth of the strop case or sheath when the strop is placed therein, it being made of such size as to fit across the interior of said sheath.

The opposite faces *a a* of the hone-body not covered by the strap are prepared for hone-surfaces by coating them with emery of different grades.

Shallow channels *k* are cut in the sides of the hone-body under the belt to allow said belt to bend downward when the razor-blade is pressed thereon in giving it the final strokes on the fine surfaces of the same. The outer surfaces of the belt or strap *b* are kept sufficiently away from the hone-body by the thickness of the body of the strap itself and the strip of wood *l* so as not to sink below the surfaces of the ribs *n*, forming the sides of the channels *k*, and allow the blade to ride upon said surfaces while being sharpened upon the strap.

In view of the patents above mentioned and others, it is not intended in this application to claim broadly the suspending of a belt or strap over the sides of a body with means to adjust the tension of the same; nor the combination in the same instrument of suspended strap and hone surfaces; nor a body or frame supporting a suspended strap, having a mortise in which a block or nut moves to regulate the tension of the strap; but

What we claim, and wish to secure by Letters Patent, is—

1. The combination, in a razor-strop, of the four-sided oblong or prismatic body A, with the suspended belt passing over two sides of said body and attached to a nut at the handle end of the strop, guides rigid with and projecting from the body at one end of the strop and bearing against the nut and the adjusting-screw passing through a bearing secured to the outer ends of said guides at a point between the nut and the handle, said screw also having a bearing at its end in one end of the hone-body, substantially as described and shown.

2. The combination, in a razor-strop, of the four-sided oblong or prismatic body A, with the suspended belt passing over two sides of said body, and attached to a nut at the handle end of the strop, guides rigid with and projecting from the body at one end of the strop and bearing against the nut, and the adjusting-screw passing through a bearing secured to the outer ends of said guides at a point between the nut and the handle, substantially as described and shown.

3. The combination, in a razor-strop, of the

BEST AVAILABLE COPY body A, with the suspended belt passing over two sides of said body and attached to a nut at the handle end of the strop, means rigid with the body and opposing the edge of the nut to prevent the rotation of the latter, and the screw provided with a handle and passing through the nut, and a bearing for the screw secured to the outer ends of the guides at a point between the nut and the handle, substantially as shown and described.

4. The combination, in a razor-strop, of the hone-body A, having a recess, *d*, formed at one end, with a suspended belt passing through said recess and over two sides of the hone-body, and applied to an adjustable nut that is fitted upon the adjusting-screw and is arranged between the walls of the recess, substantially as set forth and shown.

5. The combination, with the hone-body A, of the belt passing over two of the sides of said body, and also through a recess in one end of the latter, the nut for holding and tightening the belt arranged and guided within the recess, and the screw passing through the nut and working in bearings at opposite sides of the nut, substantially as shown and described.

6. A body, A, constructed with the hone-sides *a a*, recess *d*, and channels *k*, in combination with the belt or strap *b*, with means to adjust the tension of said belt or strap, substantially as shown and described.

7. A hone-body, A, provided with a recess, *d*, and suspended belt *b*, in combination with the nut-block *e*, screw *g*, handle B, and block *h*, substantially as shown and described.

JOHN LAMONT.
ALEXANDER P. LAMONT.

Witnesses:
E. B. WHITMORE,
GEO. HEBARD.